(12) United States Patent
Genet et al.

(10) Patent No.: US 11,279,395 B2
(45) Date of Patent: Mar. 22, 2022

(54) STEERING COLUMN WITH ADJUSTMENT LIMIT STOP

(71) Applicant: ROBERT BOSCH AUTOMOTIVE STEERING VENDOME S.A.S., Vendome (FR)

(72) Inventors: Nicolas Genet, Coulommiers la Tour (FR); Christophe Pata, Coulommiers-la-Tour (FR); Jeremy Renard, Naveil (FR); David Frelon, Neuville sur Brenne (FR)

(73) Assignee: ROBERT BOSCH AUTOMOTIVE STEERING VENDOME S.A.S., Vendôme (FR)

( * ) Notice: Subject to any disclaimer, the term of this patent is extended or adjusted under 35 U.S.C. 154(b) by 2 days.

(21) Appl. No.: 16/954,119

(22) PCT Filed: Dec. 14, 2018

(86) PCT No.: PCT/EP2018/085027
§ 371 (c)(1),
(2) Date: Jun. 15, 2020

(87) PCT Pub. No.: WO2019/115796
PCT Pub. Date: Jun. 20, 2019

(65) Prior Publication Data
US 2021/0163057 A1 Jun. 3, 2021

(30) Foreign Application Priority Data
Dec. 15, 2017 (FR) .................................... 1762256

(51) Int. Cl.
*B62D 1/189* (2006.01)
*B62D 1/184* (2006.01)
*B62D 1/19* (2006.01)

(52) U.S. Cl.
CPC .............. *B62D 1/189* (2013.01); *B62D 1/184* (2013.01); *B62D 1/192* (2013.01)

(58) Field of Classification Search
CPC ........ B62D 1/189; B62D 1/184; B62D 1/192; B62D 1/195
See application file for complete search history.

(56) References Cited

U.S. PATENT DOCUMENTS 6,039,350 A 3/2000 Patzelt et al.
10,696,319 B2 * 6/2020 Shiroishi ................ B62D 1/184
(Continued)

FOREIGN PATENT DOCUMENTS

EP 2 585 355 4/2015
JP H09 2294 1/1997

OTHER PUBLICATIONS

PCT/EP2018/085027, Apr. 8, 2019, International Search Report and Written Opinion.

*Primary Examiner* — Drew J Brown
(74) *Attorney, Agent, or Firm* — Ray Quinney & Nebeker P.C.; Paul N. Taylor

(57) ABSTRACT

A steering column having an adjustment limit stop device comprising a body receiving, in a deformable bearing, the sleeve carrying the steering wheel and a mechanism for clamping a shaft with a lever carrying a clamping device compressing the deformable bearing. The steering column comprises a stop device provided with a stop edge carried by the sleeve and with which a lock cooperates that limits the adjustment travel of the sleeve while being retracted after the adjustments of the column have been clamped, allowing the sleeve to travel, in the event of an impact on the steering wheel, in order to absorb the energy.

7 Claims, 12 Drawing Sheets

(56) References Cited

U.S. PATENT DOCUMENTS

| | | | | |
|---|---|---|---|---|
| 2017/0259841 A1* | 9/2017 | Anspaugh | ............... | B62D 1/184 |
| 2018/0312189 A1* | 11/2018 | Geiger | .................. | B62D 1/189 |
| 2018/0327019 A1* | 11/2018 | Bodtker | ................ | B62D 1/184 |
| 2019/0077439 A1* | 3/2019 | Huber | .................... | B21D 51/02 |
| 2019/0135328 A1* | 5/2019 | Fricke | ................... | B62D 1/185 |
| 2020/0339180 A1* | 10/2020 | Buys | ..................... | B62D 1/195 |

\* cited by examiner

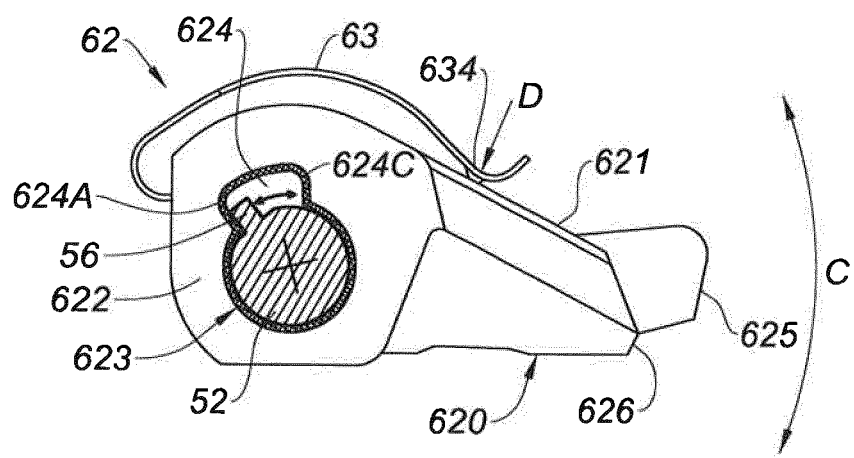
Fig. 6A
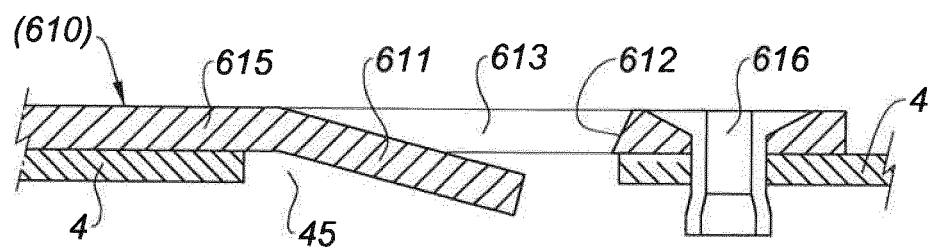
Fig. 6B
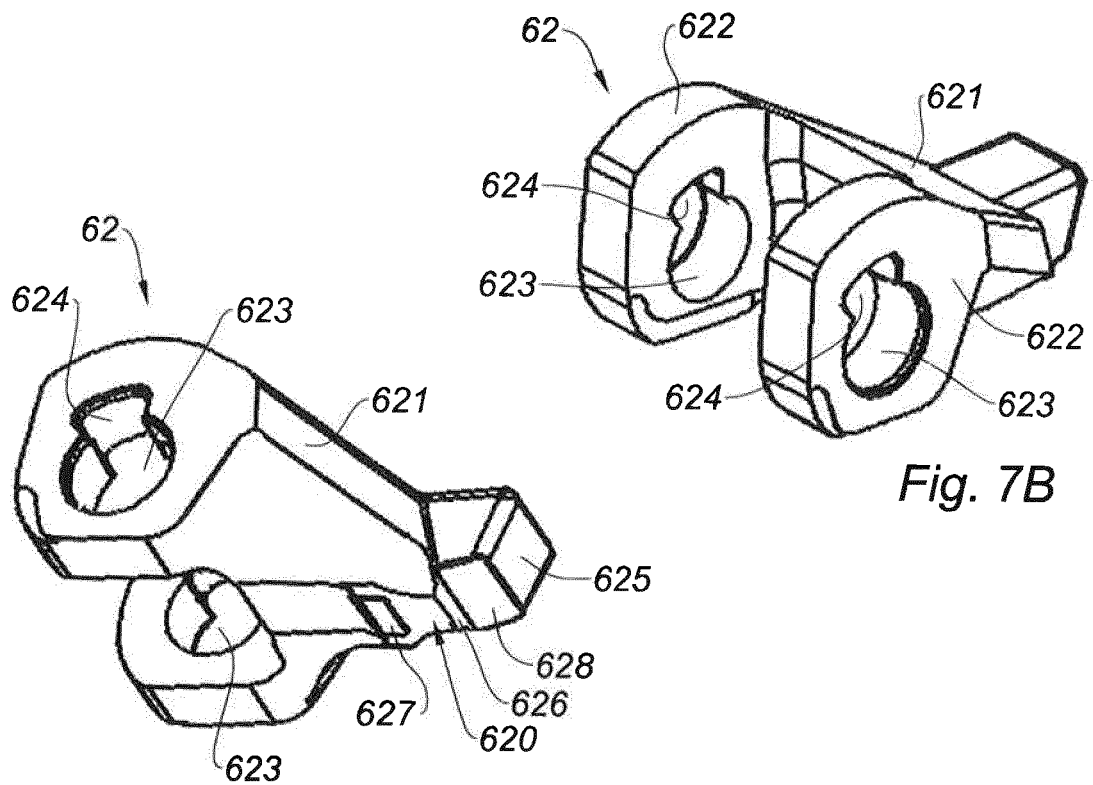
Fig. 7B
Fig. 7A

STEERING COLUMN WITH ADJUSTMENT LIMIT STOP

FIELD OF THE INVENTION

The present invention concerns a steering column comprising a compression adjustment limit stop device of a steering column, restricting the compression adjustment to this end of travel position, to allow an energy absorption compression travel, comprising: a body receiving, in a deformable bearing, the sleeve supporting the steering wheel, which is longitudinally adjustable relative to the body, where a tightening mechanism has a shaft with an operating lever supporting a tightening device compressing the deformable bearing in which the sleeve can slide, where this tightening device locks the sleeve in the tightened position, and allows it to slide in the untightened position, and where the shaft of the tightening mechanism can be swivelled between its two positions by the driver using the operating lever.

STATE OF THE PRIOR ART

Most current motor vehicles have a system for adjusting the depth and height of the steering wheel (angular adjustment and longitudinal adjustment). The depth adjustment is made using a set of telescopic tubes incorporated into the steering column. A tightening mechanism enables, in the unlocked position (or untightened position), the position of the steering wheel to be adjusted and, in the locked position (tightened position), the steering wheel to be held in the chosen position.

In the event of a frontal impact to the vehicle the telescopic tubes provide the travel required to absorb the energy of the driver's impact against the airbag and the steering wheel. This travel is greater than the steering wheel's adjustment travel, and can contain a portion of it. A friction or deformation system generates the force which, combined with the motion, absorbs the impact energy.

If the energy absorption travel includes a portion of the adjustment travel a discontinuity occurs at the end of the adjustment travel, which is limited by stops. Beyond the energy absorption travel, which extends further than the adjustment travel, the adjustment limit stop must not stop the motion of the energy absorption travel. To this end a divisible stop is used, designed to resist the forces for the adjustment operations, until the stop is reached. This stop breaks in the event of a frontal impact if the energy absorption motion must go beyond the adjustment end of travel. The stop must be dimensioned such that it breaks at a sufficiently low level so as not to prevent the energy absorption motion.

Even if the stop is optimally dimensioned it is always necessary to apply a significant force to cause the breakage. This force creates a peak which is superimposed on the force generated by the energy absorption system. This peak force can disrupt optimum operation of the steering column in the event of a frontal collision, and result in unacceptable forces.

But the increasingly stringent requirements imposed on motor vehicle manufacturers concerning performance of vehicles in collision situations, combined with the reduced encumbrance allowed for the steering column, require that the steering wheel's adjustment travel is used to absorb the impact energy. The necessary travel in a situation of a frontal impact is greater than the adjustment travel, such that the steering column must go further than this travel without being limited by the steering wheel's travel adjustment stops.

AIM OF THE INVENTION

The aim of the present invention is to develop a steering column enabling these requirements concerning energy absorption to be met by a travel beyond the adjustment travel, achieving as continuous as possible a development of the forces in the compression travel of the steering wheel and of the mechanism which supports it, in the event of a collision, without creating a peak force, as in the solutions of the state of the art.

DESCRIPTION AND ADVANTAGES OF THE INVENTION

To this end, the purpose of the present invention is a steering column with a compression adjustment limit stop device of a steering column, restricting the compression adjustment to this end of travel position, to allow an energy absorption compression travel, and comprising:
 a body receiving, in a deformable bearing, a sleeve supporting the steering wheel, which is adjustable longitudinally relative to the body,
 a tightening mechanism with a shaft with an operating lever supporting a tightening device compressing the deformable bearing locking the sleeve in the tightened position or allowing it to slide in the untightened position,
 where the shaft of the tightening mechanism can be swivelled between these two positions with the operating lever.
The steering column comprises:
 a stop device with an abutment edge supported by the sleeve and forming an adjustment limit stop in the compression direction,
 where the tightening shaft has a mobile drive rib, through the swivelling of the tightening shaft between:
  a tightened position to lock the adjustments of the column,
  a pre-tightened position for the anticipated locking of the adjustments of the steering column, and
  an untightened position to enable longitudinal adjustment (direction XX) and angular adjustment of the steering column,
 a bolt installed on the tightening shaft, having:
  a circular runner forming a crescent-shaped clearance, delimited by two relative end of travel sides of the drive rib,
  a tip pushed by the spring such that it presses against the surface of the sleeve, and
  a stop surface supported by the tip and abutting with the stop edge when the sleeve passes under the bolt during adjustment,
 where the bolt is put into its locked position by the drive rib swivelling from the angular untightened position to the tightened position only after it passes through a pre-tightened position corresponding to the tightening of the adjustments by the tightening shaft without swivelling the bolt, and without releasing it from its locking position, before the drive rib abuts with the side of the runner, and then swivels the bolt and releases it from its position in which the sleeve is locked in the compression direction.

The steering column according to the invention has the advantage that it guarantees an energy absorption travel which applies to the moving part, i.e. the sleeve supporting the steering wheel in the event of a violent thrust, a change of force without any discontinuity or peak force, by a regular travel, to absorb the energy of the impact efficiently.

The bolt which limits the longitudinal adjustment range of the sleeve is put into a retracted position after the settings are pretightened, and is held in this position mechanically, such that there is no risk that the impact exerted on the steering wheel and the sleeve may put the bolt into an active position which may interfere with the sleeve and block its cushioning travel.

The steering column according to the invention creates practically no additional encumbrance, and does not limit in any way the possibilities of angular and longitudinal adjustment of the steering column according to the driver's wishes. The operation which the driver must carry out to make the adjustment is unchanged compared to a traditional operation which they will have undertaken with known steering columns, such that for the user the steering column according to the invention requires no new learning, and it appears to operate in a traditional manner.

According to another advantageous characteristic, the stop device comprises a slot in the sleeve or in a blade, and this slot has an edge which forms the stop with which the stop surface of the bolt for the compression adjustment end of travel of the steering column abuts.

This embodiment is advantageous since it offers great freedom of design, and allows a choice of materials having different characteristics, appropriate for the sleeve and the stop edge. This attached part also reinforces the action zone of the bolt on the sleeve.

According to another advantageous characteristic, the slot forms a tongue preventing the bolt from moving in any way other than by its support surface abutting with the stop edge. This slot can be made either in the sleeve or in a part attached to the sleeve.

Thus, advantageously, the stop device is made in a blade attached to the sleeve in the zone of the sleeve which passes under the bolt. This stop device can thus be made from another material or from a material with characteristics different to those of the sleeve, for reasons relating to its ability to be held at the stop position, and possibly to improve the effect of absorption of the impact energy on the steering wheel.

According to another advantageous characteristic, the bolt is a part installed around the shaft and having a tip supporting the stop surface, at least one lug with an aperture to receive the shaft and a curved runner on the edge of the aperture, and receiving the drive rib, which is securely coupled to the shaft, to achieve a free relative range of movement between the shaft and the bolt, with a spring securely coupled to the shaft and pressing on the tip to push the stop surface into the locking position. This form of embodiment of the bolt is simple and does not increase the encumbrance of the steering column, since the bolt is installed on the shaft of the tightening mechanism which locks the adjustments of the steering column.

According to another advantageous characteristic, the bolt comprises two lugs, each of which straddles the shaft and its rib, and a spacer locked on the shaft and its rib to retain the bolt by both its lugs on the shaft and its rib in the direction of the shaft.

This embodiment of the blade is particularly simple to manufacture and to assemble.

According to another advantageous characteristic, the spring is a leaf spring terminated by two clips, each having an aperture, to be clipped on to the shaft by this aperture with a slot receiving the rib of the shaft so as to couple the spring securely to the shaft for rotary motion.

The two clips of the spring are advantageously sandwiched between the spacer and the two lugs, either side of the spacer, such that the clips cannot work loose through the sides. They thus ensure precise positioning of the blade of the spring, the end of which presses on the tip of the bolt to push the latter into a locking position by its stop surface against the stop of the stop device.

DRAWINGS

The present invention will be described below, in a more detailed manner, using an embodiment of a steering column represented in the appended drawings, in which.

Figure 3:
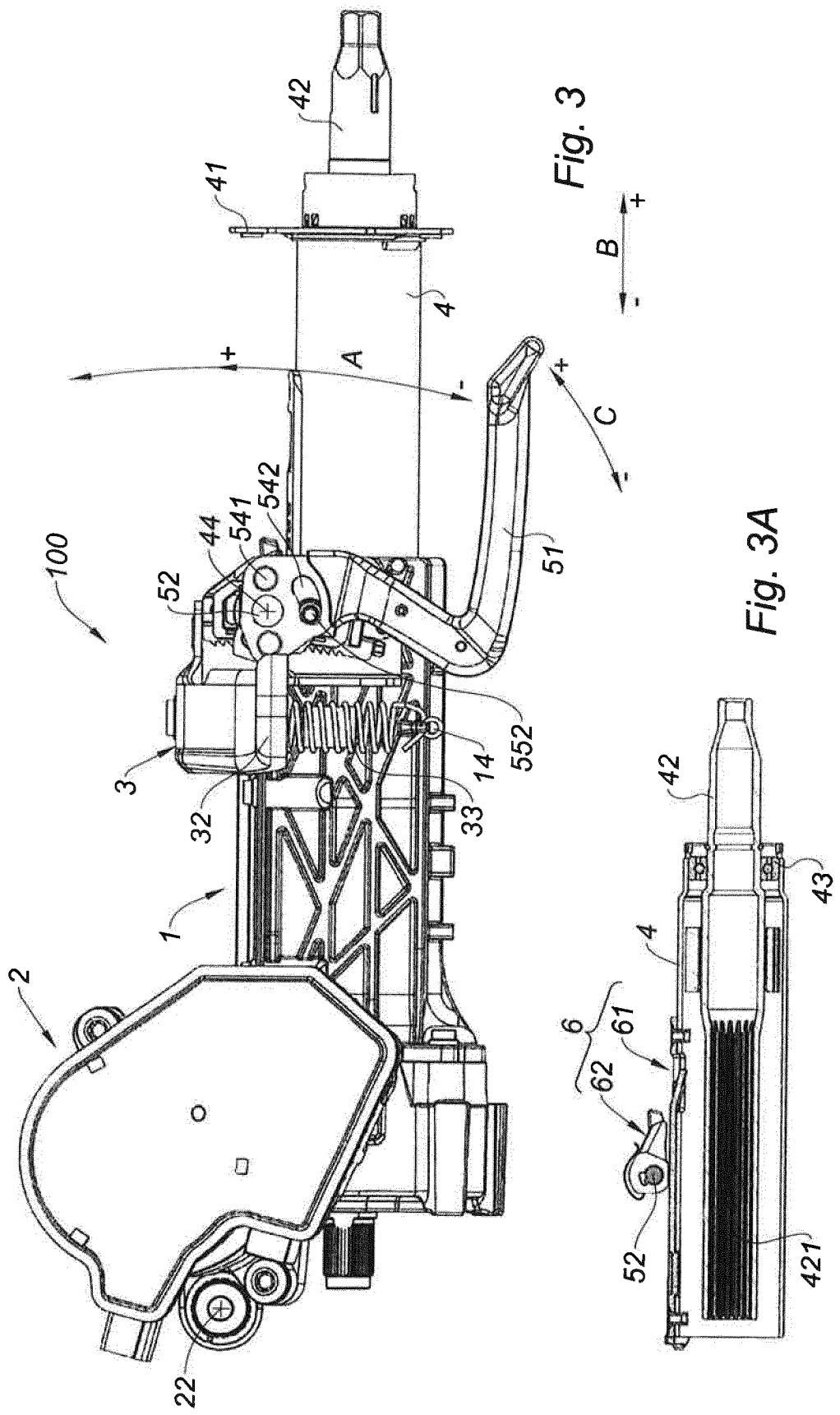
FIG. 3 is a side view of the steering column.
Figure 4:
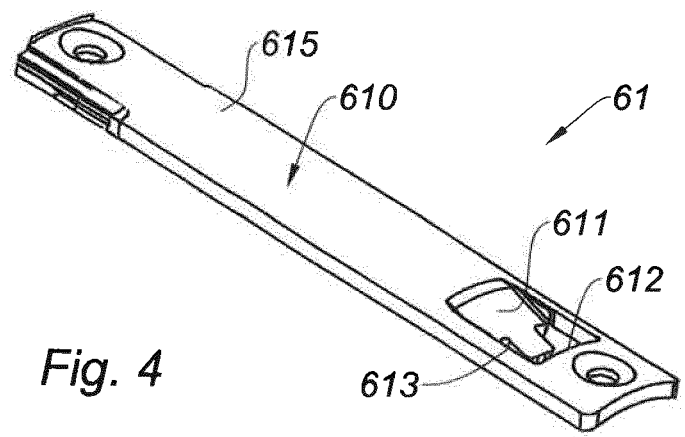
Figure 5:
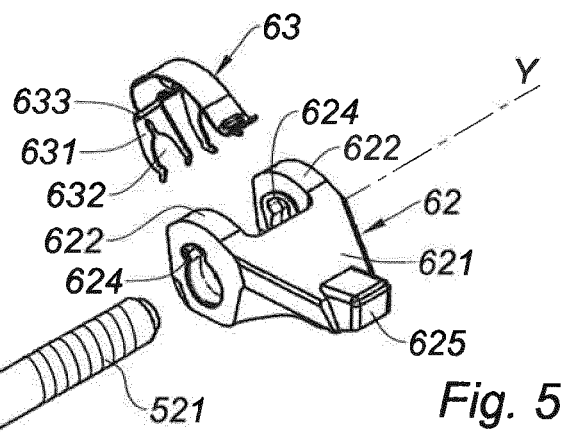
Figure 5A:
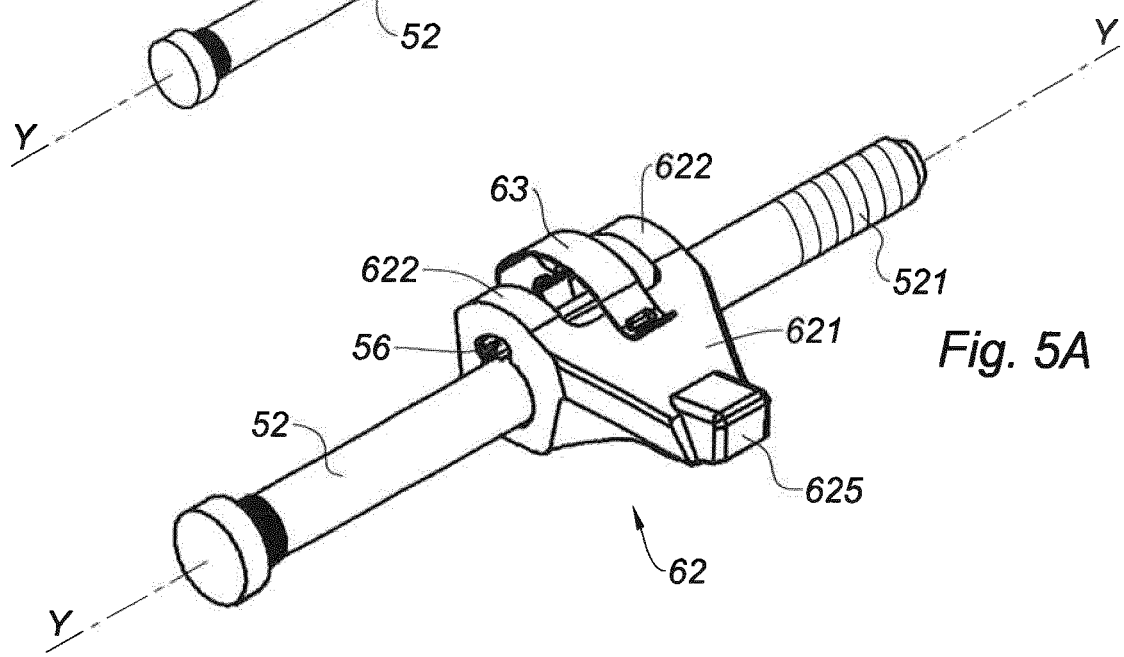
Figure 8A:
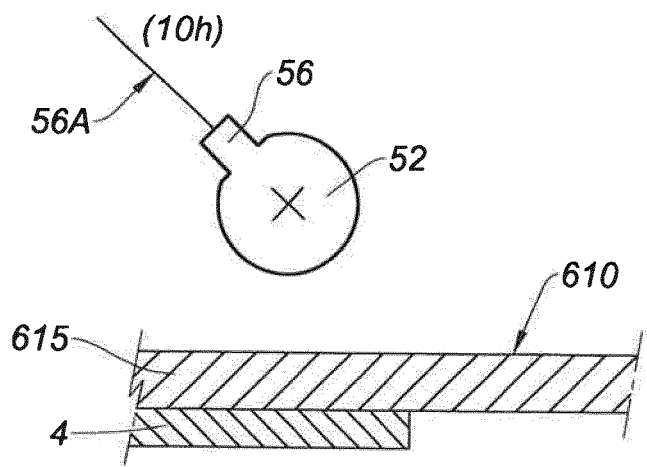
Figure 8B:
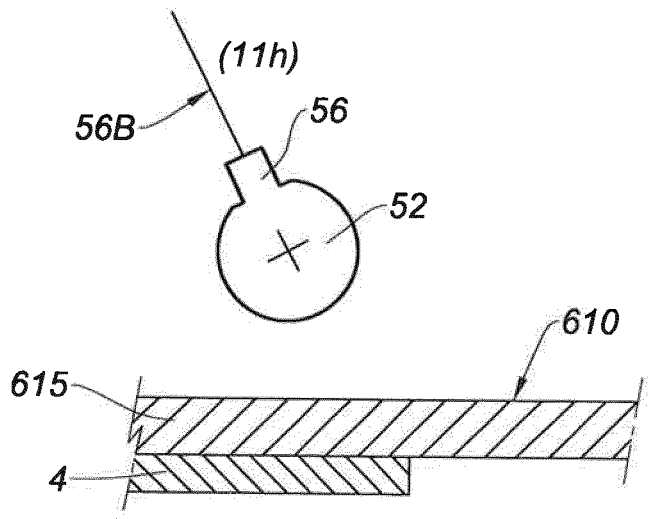
Figure 8C:
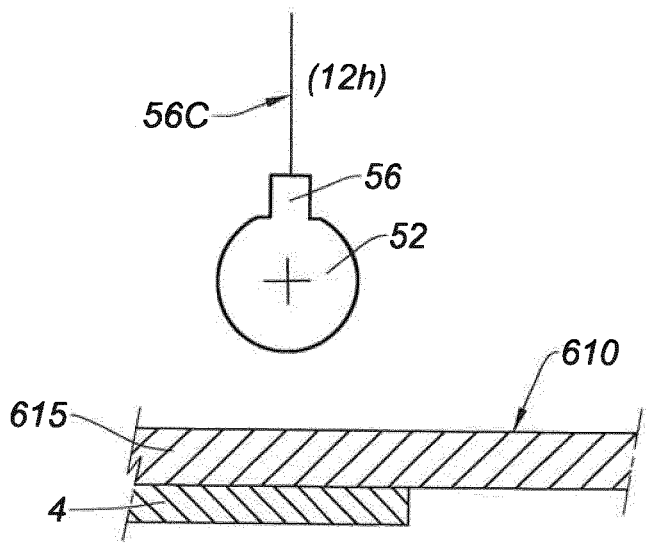
Figure 9A:
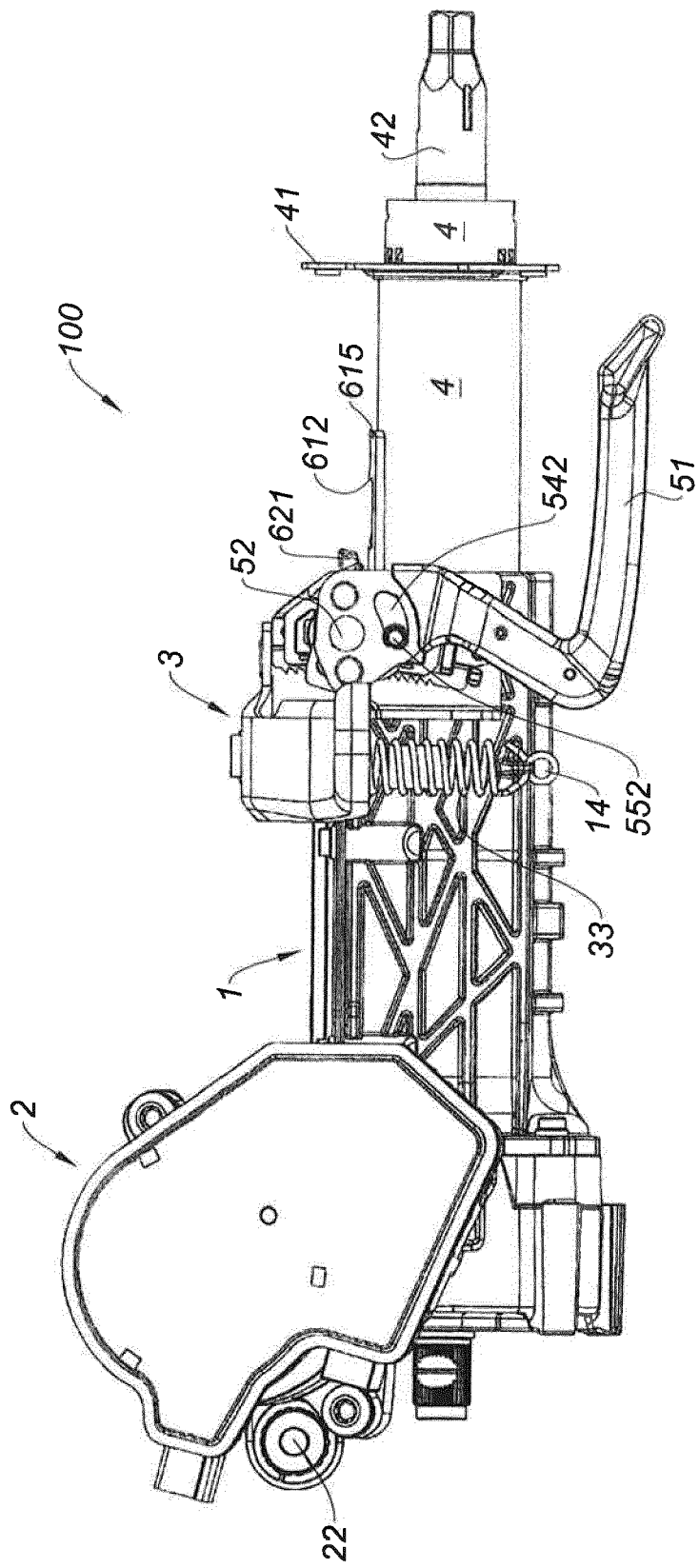
Figure 9B:
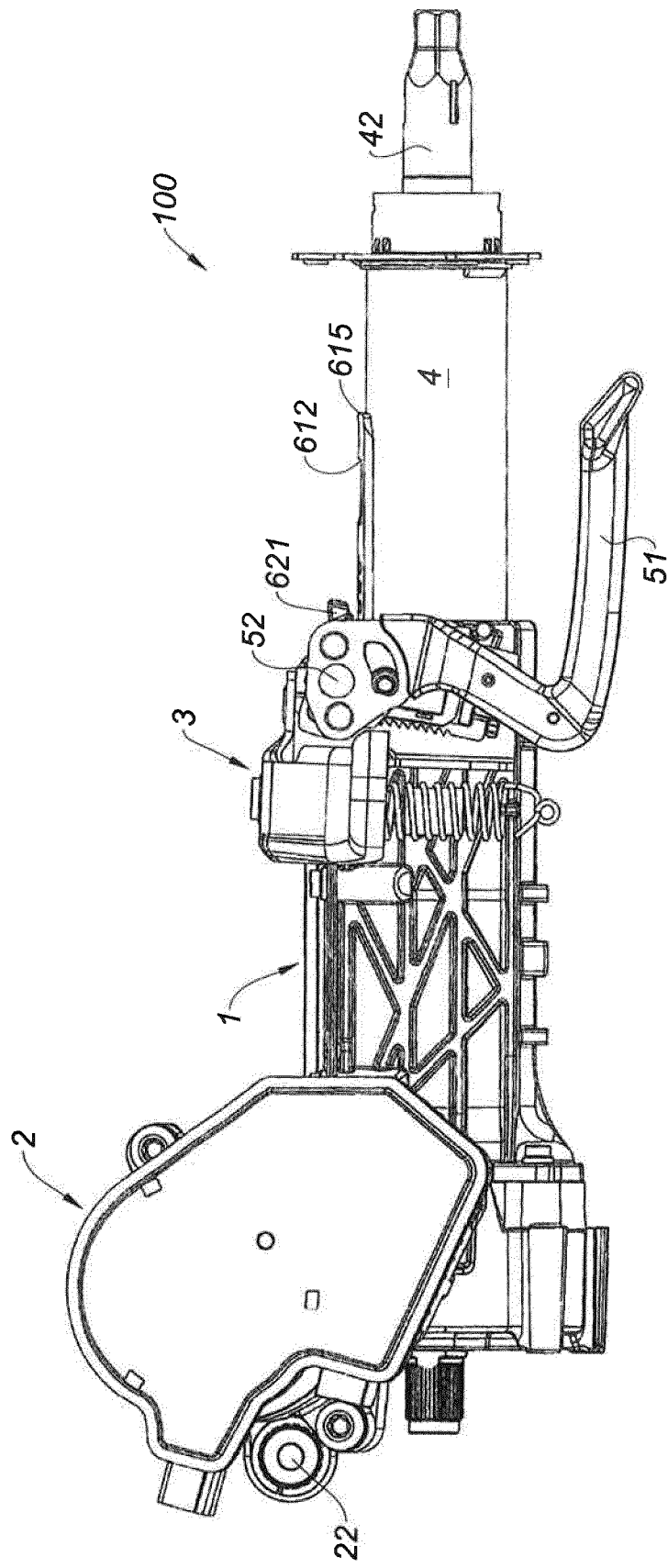
Figure 9C:
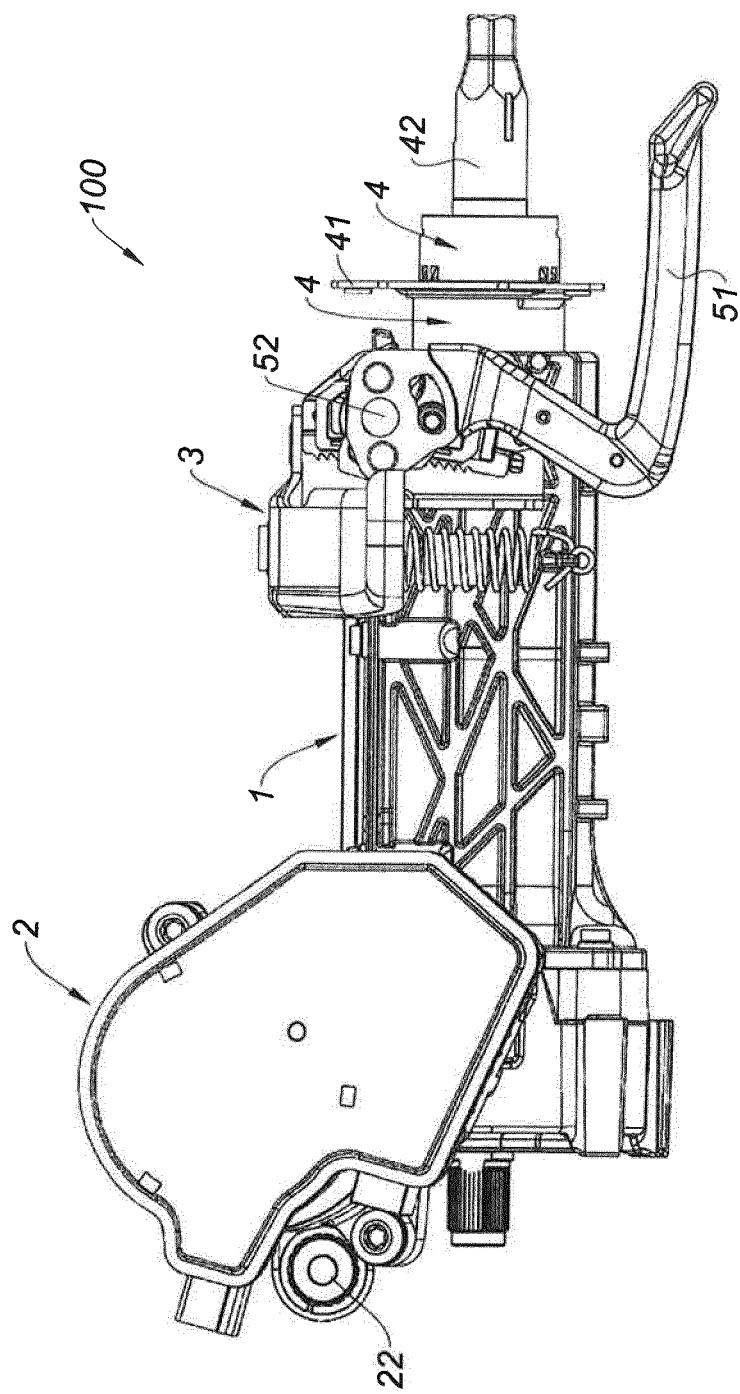
Figure 10A:
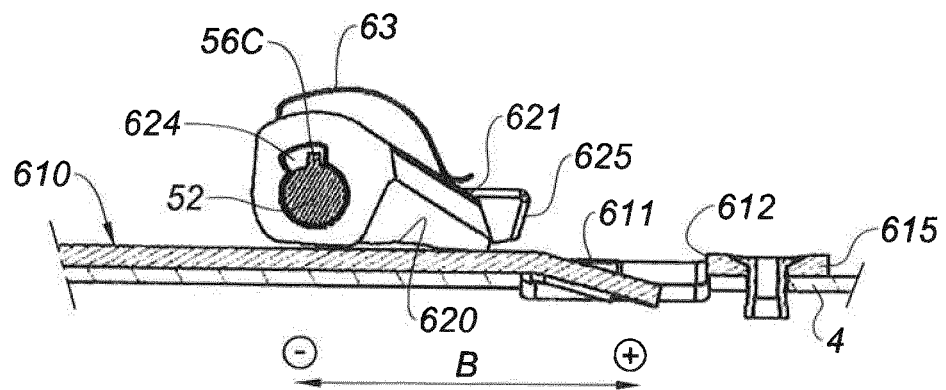
Figure 10B:
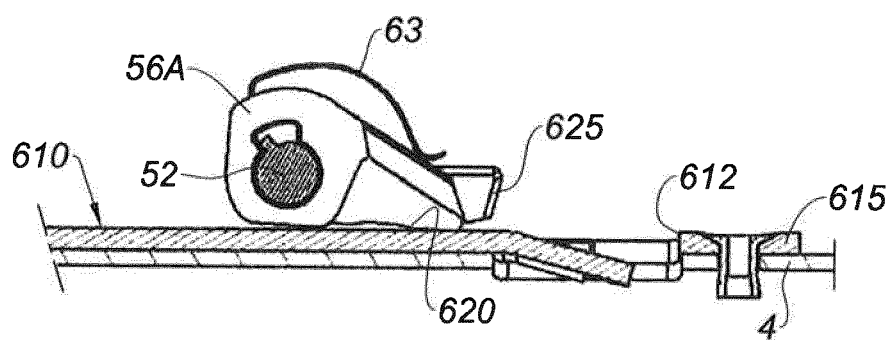
Figure 11A:
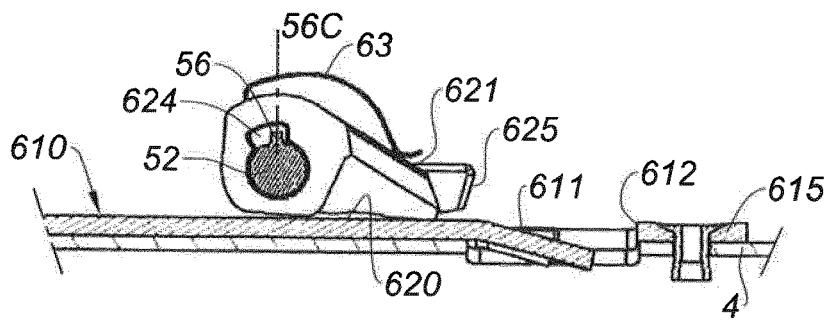
Figure 11B:
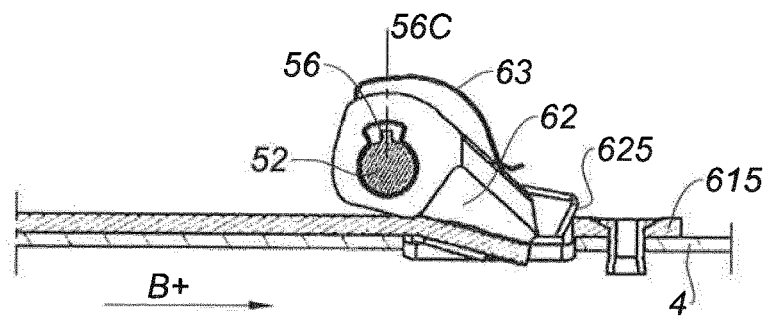
Figure 11C:
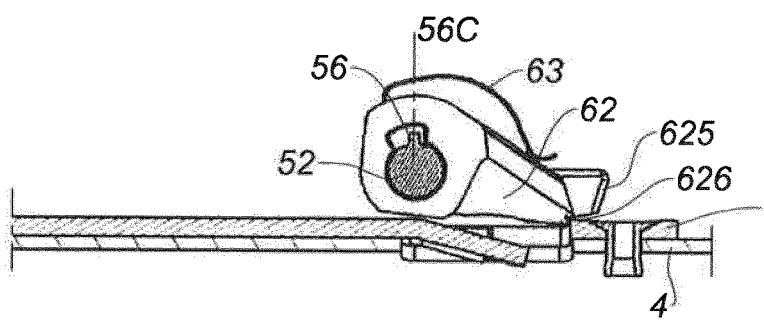
Figure 11D:
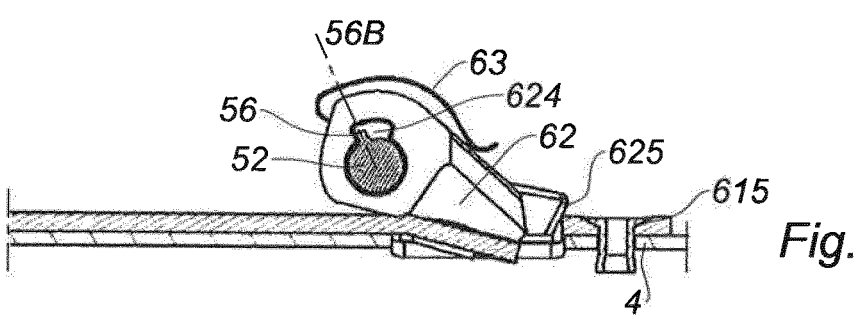
Figure 11E:
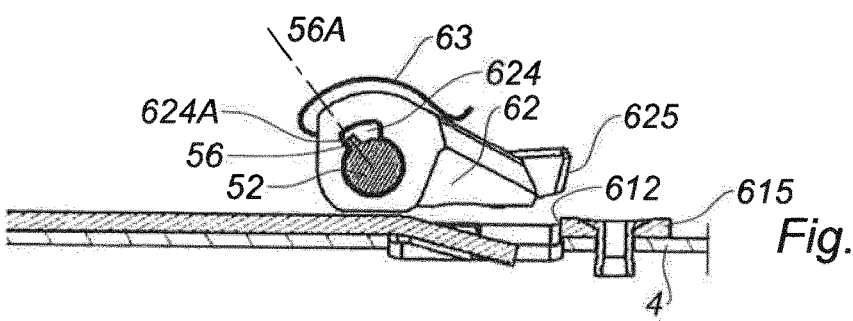
Figure 12A:
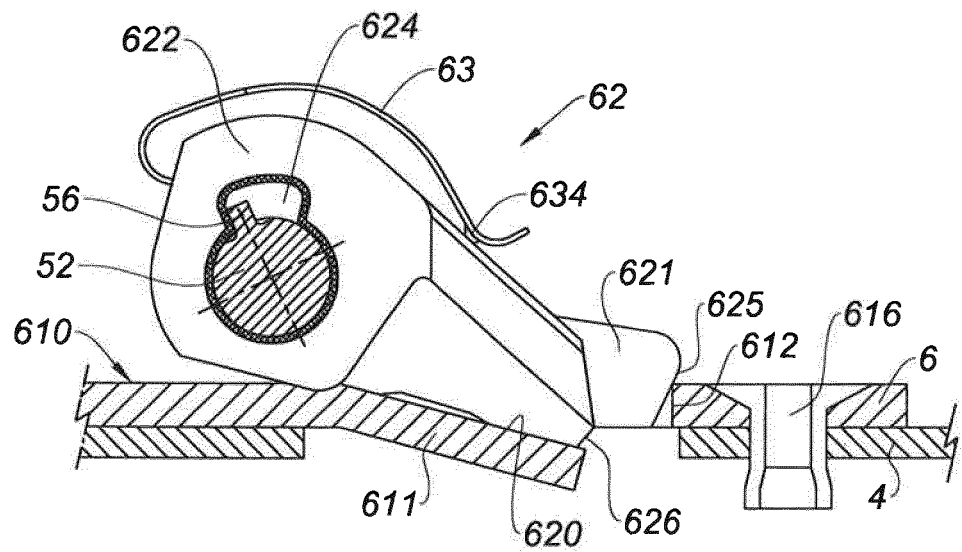

FIG. 3A is a cross-section view of the sleeve and of the tube of the steering column supporting the steering wheel, FIG. 4 is an isometric view of the blade of the end of travel locking device, FIG. 5 is an exploded view of the tightening shaft and of the bolt of the locking device, FIG. 5A is a view of the assembled locking device, FIG. 6A is a side view of the bolt, FIG. 6B is it a cross-section view of the blade of the end of travel locking device, FIGS. 7A, 7B are two isometric views of the bolt of the end of travel locking device, FIG. 8, in parts 8A-8C, shows the three characteristic positions of the tightening shaft:

FIG. 8A shows the adjustment tightening position,

FIG. 8B shows the pre-tightening position,

FIG. 8C shows the untightening position,

FIG. 9A is a side view of the steering column in the adjusted state, in a position of intermediate extension of the adjustment range, FIG. 9B is a side view of the steering column in the adjusted state, in a position where it is fully extended, FIG. 9C is a side view of the steering column in the compressed state after an impact, FIGS. 10A-10B and 11A-11E show the cooperation between the bolt and the blade of the locking device in various operating positions, FIG. 12A is a cross-section view of the bolt in the locking position and of the shaft in the pre-tightening position.

Figure 12B:
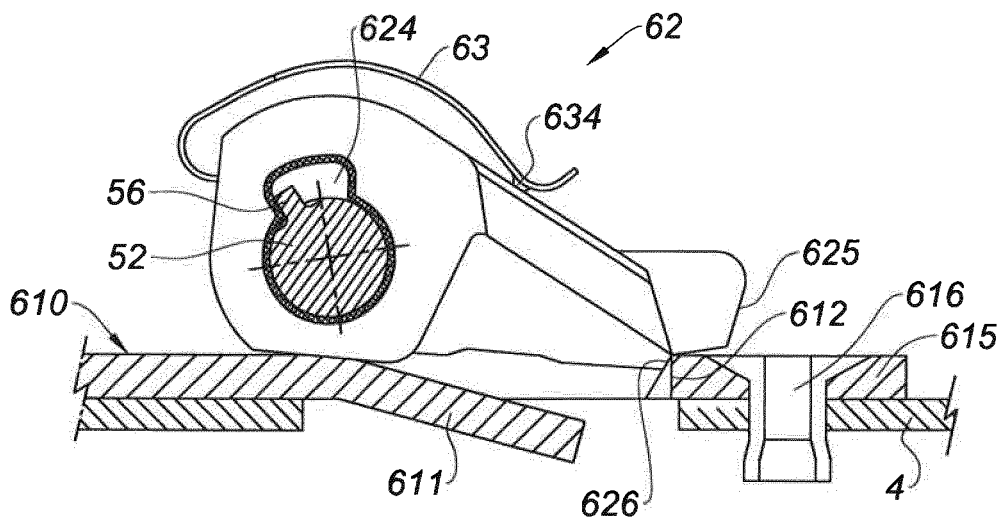

FIG. 12B is a cross-section view of the locking device in the auxiliary locking position.

DESCRIPTION OF AN EMBODIMENT OF THE INVENTION

Figure 1:
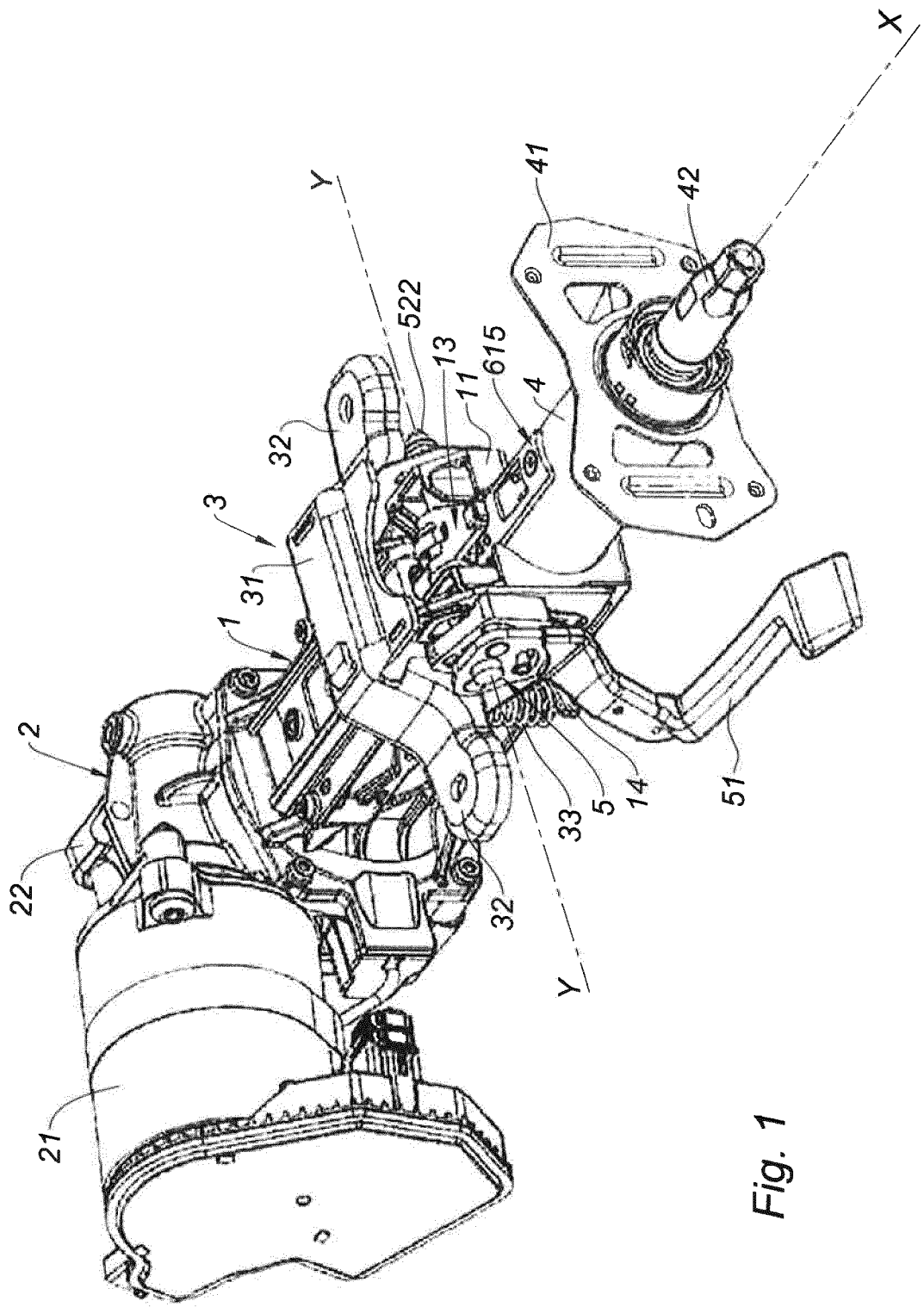
FIG. 1 is an isometric view of a steering column according to the invention.
Figure 2:
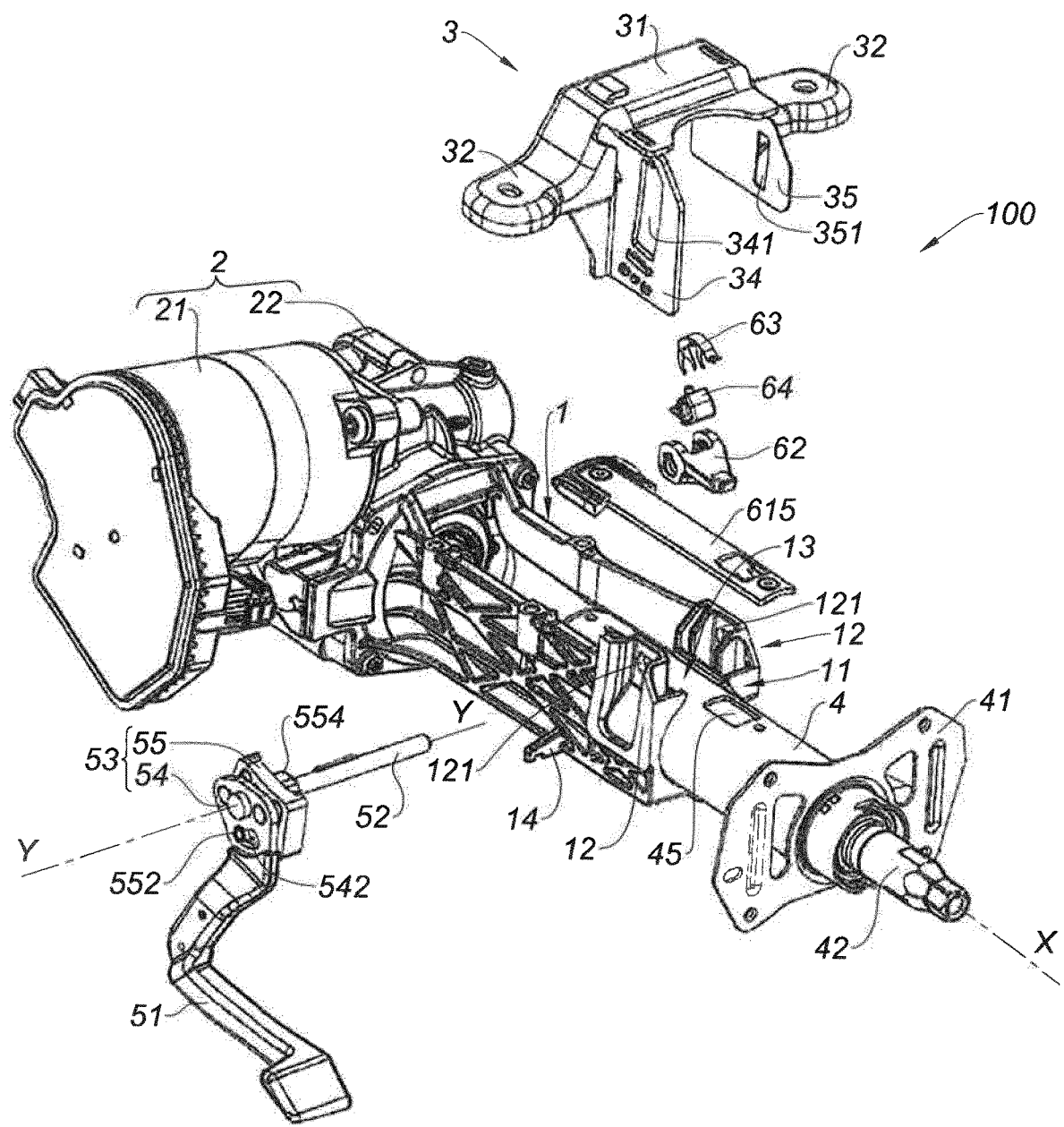
FIG. 2 is an exploded view corresponding to FIG. 1.

According to FIGS. 1 and 2, the purpose of the invention is a steering column 100, represented diagrammatically without the environment in which it is installed, without trim and without the steering wheel.

Steering column 100 is comprised of a box-shaped body 1, of rectangular section, connected to assistance module 2 cooperating with the steering rack to control the alignment of the steered wheels. Assistance module 2 comprises an engine 21 with its control accessories such as the driving wheel rotation sensor to activate engine 21. Body 1 receives, in a longitudinally adjustable manner, a sleeve 4 fitted with bracket 41 supporting the control elements, for example for speed regulation, the audio system, the telephone, and certain functions of the dashboard. Sleeve 4 holds tube 42 supporting the steering wheel. Body 1 is, itself, installed swivelling in a "vertical" plane relative to the bodywork for angular adjustment of the position of the steering wheel, in addition to its longitudinal adjustment along axis XX. Longitudinal adjustment of sleeve 4 is synonymous with longitudinal adjustment of the steering wheel, since sleeve 4 and tube 42 are translationally secured to one another.

In the remainder of the description of the claims, when covering adjustment of the sleeve, this means implicitly that the adjustment concerns the steering wheel.

To allow the adjustments this assembly is fitted, on the side of assistance module 2, with a tab 22 supporting a pivot, and near the end of the body, with a bracket 3 attached to the bodywork, as pivot 22. This assembly allows angular adjustment by tipping (in a vertical plane, relative to the bodywork), and adjustment by axial extension (XX) for tube 42 supporting the steering wheel.

The assembly has a tightening mechanism 5 which is untightened to allow adjustment both angular and by axial extension, and the tightening of which locks the adjustments made by the driver. Tightening mechanism 5 releases both the tipping of column 100 around pivot 22, and axial extension of sleeve 4 of steering column 100.

In the present invention and its description only the longitudinal adjustment is concerned.

Sliding sleeve 4 is held in a deformable bearing 11 installed at entrance 13 of body 1. When it is not tightened, bearing 11 enables sleeve 4 to be slid in the direction of axis XX to adjust the extension position of the steering column. In the tightened state bearing 11 is locked against sleeve 4 and immobilises it. This tightening is accomplished by tightening mechanism 5 operated by a lever 51. For reasons of safety imposed by certain regulations, even in the tightened state, tightening mechanism 5 enables sleeve 4 to slide, when pushed by the movement of the driver who, in the event of an accidental impact, is propelled against the airbag and the steering wheel. The steering wheel must then be able to be pushed in to absorb the energy of the impact by friction, in particular in tightened bearing 11, and in a cushioning device which is not described in detail, over a certain length of travel.

The exploded view of FIG. 2 provides a better view of the shape of the components and how they are organised. Body 1 is a ribbed part, rigid beyond its entrance zone 13 forming deformable bearing 11, for example, an injected alloy part. In addition to the surfaces of bearing 11 in contact with sleeve 4, body 1 comprises guide surfaces 12 externally receiving tightening mechanism 5 operated by lever 51, together with the means of connection of bracket 3.

Bracket 3, which has the shape of a staple, attached to the bodywork, consists of a crosspiece 31 with two tabs 32 either side of body 1, to which they are connected by two return springs 33, each attached to a tab 14 and supporting the weight of body 1 when tightening mechanism 5 is released (FIG. 1). Bracket 3 has two guide cheeks 34, 35 laterally abutting with external support surfaces 12 of body 1. Cheeks 34, 35 have runners 341, 351 to receive tightening mechanism 5. This mechanism 4 is formed of a tightening shaft 52 supporting a tightening device 53. One end of shaft 52 is securely coupled to lever 51 operating the mechanism, and the other end is threaded 521 to receive a nut 522 (FIG. 1). Tightening shaft 52 has a transverse geometrical axis YY, perpendicular to axis XX of sleeve 4, and generally of steering column 100.

Tightening device 53 acting in transverse direction YY is formed from a plate 54 which is securely coupled with lever 51 and with shaft 52, and also with a rectangular base 55, which is freely engaged on shaft 52, and which has at the back a slide 551 which is securely coupled with base 55.

Plate 54 and base 55 cooperate by extension organs such as ramps or connecting rods with ball joints forming spacer devices enabling the separation of plate 54 and of base 55 in direction YY to be modified to pull on tightening shaft 52, and to tighten the mechanism. These known spacer devices do not require any detailed description and are not visible. It is sufficient to emphasise that they are acted on by the swivelling motion of lever 51, i.e. of plate 54 relative to base 55: as stated, the opposite faces of plate 54 and of base 55 cooperate by ramps or by the pair of connecting rods, each of the two ends of which, in the form of a ball joint, are pressed in a cup 541 of plate 54 and in a cup of base 55. The cups and the connecting rods are in symmetrical positions relative to tightening shaft 52.

The relative swivelling motion of plate 54 relative to base 55 inclines or straightens the connecting rods, reducing or increasing the separation between plate 54 and base 55, and creating the traction effect exerted by tightening shaft 52.

Tightening shaft 52 traverses both guide cheeks 34, 35 of bracket 3, applied externally against support surfaces 12 of deformable bearing 11 and piercings 121 of these support surfaces 12.

Slide 551 of base 55 is held in runner 341 of appropriate section of one 34 of the cheeks of bracket 3, and the threaded end of shaft 51 traverses runner 351, which is narrower than other cheek 35 to receive nut 521 (FIG. 1).

Tightening mechanism 5 presses, by base 55, against guide cheek 34 and by nut 521 against other guide cheek 35, where both cheeks are, themselves, pressing against support surfaces 12 of bearing 11.

In the untightened position, the separation between plate 54 and base 55 is at its smallest, such that bearing 11 is not tightened, like cheeks 34, 35 of bracket 3 relative to support surfaces 12. In the tightened position the separation between the plate and the base increases, which reduces the separation between base 55 and nut 521, such that cheeks 34, 35 and support surfaces 12 are compressed and lock:
  sleeve 4 in bearing 11 (extension adjustment),
  cheeks 34, 35 against support surfaces 12 (angular adjustment).

The motion of lever 51 for tightening/untightening is limited by a catch 552, securely coupled with base 55 and held in a crescent-shaped runner 542 of plate 54. It should be noted that base 55 is prevented from swivelling by the engagement of its slide 551 in runner 341 of cheek 34 of bracket 3

The side view of FIG. 3 shows the following adjustment ranges:
  angular adjustment in the vertical plane (relative to the bodywork) (arrow A) in the ascending direction (+) and in the descending direction (−). The angular adjustment range is limited by runner 342 of bracket 3,
  the swivelling of lever 51 around transverse axis YY is indicated by curvilinear arrow C. In FIG. 3 lever 51 is in the locked position. To unlock, lever 51 must be pushed in direction (−),
  the longitudinal or telescopic adjustment of sleeve 4 in axis XX (arrow B) in the extension (+) and compression (−) direction. This adjustment is limited in both directions. The compression can be exceeded in the event of an impact. FIG. 3A shows the details of sleeve 4 and of tube 42 supporting the steering wheel. Sleeve 4 is prevented from rotating in body 1, while tube 42 of the steering wheel is translationally secured (direction XX) to sleeve 4, but is free to rotate in relation to it. It is installed in a rolling bearing 43. Internally, end 421 of tube 42 is fluted to receive the end with external splines of the tube which is prevented from sliding, connected to assistance module 2 to enable telescopic sliding of sleeve 4 and of tube 42. This FIG. 3A also shows compression adjustment limit stop device 6 described below. Indeed, steering column 100 according to the invention has a compression adjustment limit stop device 6, activated by the untightening of tightening mechanism 5, releasing angular adjustment and longitudinal adjustment.

Limit stop device 6 is comprised of a compression limit stop 61 made on or in sleeve 4, and of a bolt 62 supported by tightening shaft 52, abutting with limit stop 61 to limit longitudinal adjustment in this direction (XX), whilst enabling this limit to be exceeded if the driver impacts the steering wheel in the event of a collision of the vehicle.

According to FIG. 4, limit stop 61 is formed by a tongue 611 and a stop edge 612. Tongue 611 forms a support, to limit the swivelling of bolt 62 and holding of it in position against stop edge 612 of slot 613, made in this manner in a blade 615 attached to sleeve 4. Tongue 611 and stop edge 612 can thus be made directly in sleeve 4. In the case of blade 615 attached by rivets 616, sleeve 4 comprises a slot 614 to receive protruding tongue 611 (see FIG. 6B)

In the other unrepresented case, the tongue is cut in the sleeve and the edge of the slot forms the stop edge.

Limit stop device 6 is located in the median plane of sleeve 4 and thus in passage 13 left free by deformable bearing 11 of body 1 (FIG. 2).

Bolt 62 (FIGS. 5, 5A, 6A) is a component, for example made of one or more plastics, with the necessary hardness of a given part of the bolt. Bolt 62 is formed from a tip 621 connected to two lugs 622 each with a circular aperture 623 of section equal to that of tightening shaft 52, in order to be fitted on to it. Each of circular apertures 623 is lined by a crescent-shaped runner 624 to receive drive rib 56 attached to tightening shaft 52. Runner 624 has two ends 624A and 624C. Runner 624 thus allows limited relative swivelling between tightening shaft 52 and bolt 62 (FIG. 6A). The two lugs 622 receive between them a leaf spring 63 supported by two clips 631 with a circular aperture 632 and a bottom with a slot 633, so as to be able to be clipped on tightening shaft 52 in line with rib 56, which is then held in two slots 633. Leaf spring 63 is thus rigidly connected with tightening shaft 52.

The two clips 631 of leaf spring 63 are separated to receive an intermediate spacer 64 between them (FIG. 2), which is slipped on to shaft 52 at the same time as bolt 62 so as to lock bolt 62 on rib 56 (in direction YY) and to hold leaf spring 63 in position. End 634 of leaf spring 63 rests on tip 621 in direction D (FIG. 6A).

This form of embodiment of the bolt is symmetrical and runners 624 are symmetrical, and cooperate in the same way with tightening screw 52 and its drive rib 56 such that, to simplify the description below, only runner 624, not runners 624, will be described.

According to FIGS. 6A, 7A and 7B, tip 621 of bolt 62 has an underside 620 which is smooth and a stop surface 625 which is inclined to cooperate with stop edge 612 of sleeve 4 (or of blade 615 supported by the sleeve). This surface 625 is completed by an auxiliary stop surface 626 under tip 621, and is then attached to stop edge 612 if, due to vibrations caused by sudden motions or impacts exerted on sleeve 4 during an adjustment operation, stop surface 625 becomes unattached and slightly raises stop edge 612. Tip 621 pressed by spring 63 then remains held by this second stop surface 626 (FIG. 12B).

Tip 621 has an underside 620 with a flexible support surface 627, positioned over tongue 611 and also in the other positions, on top 620 (of blade 615) or of sleeve 4 if there is no blade.

There is also a support surface 628 between surfaces 625 and 626, as this can be seen, for example, in FIG. 7A. These sliding surfaces can be made from a particular plastic which is more flexible than that of the rest of the bolt.

To explain the operation of tightening mechanism 5, FIGS. 8A-8C show three characteristic positions of tightening shaft 52 and of its drive rib 56; these positions correspond respectively to tightening position 56A, to pre-tightening position 56B and to untightening position 56C.

These angular positions of tightening shaft 52, and above all of its rib 56, are those of control lever 52. While positions 56A and 56C of rib 56 are the positions defined and marked for tightening and untightening of the adjustment or adjustments, intermediate position 56B is a position close to tightening position 56B but which is not marked by a stop; it is not seen when operating lever 51.

Angular positions 56A and 56C are defined by both ends of runner 542 abutting, by its swivelling by either of its ends, with fixed catch 552 (FIG. 3).

Taking account of the relative alignment of the various components, locking position 56A is located at the 10 o'clock position; pre-tightening position 56B corresponds to the 11 o'clock position, and unlocking position 56C corresponds to the 12 o'clock position.

Slider 624 of bolt 64 which receives rib 56 drives the swivelling of bolt 52 or releases this swivelling, depending on the motions which are transmitted to bolt 62 by spring 63, and by rib 56.

FIG. 9A is a side view of steering column 100, adjusted at a certain adjustment locking position. Tip 621 of bolt 62 is raised and is not in contact with stop edge 612 of blade 615.

FIG. 9B shows an adjustment locking position comparable to that of FIG. 9A but for another adjustment corresponding, for example, to the fully extended position of sleeve 4 in the longitudinal direction (XX).

FIG. 9C is a side view of steering column 100 after an impact showing the final state of compression of sleeve 4 in body 1 of the steering column.

The tightening and untightening motions of tightening means 5 will be described below with reference to FIGS. 10A-11E, which show various positions of bolt 62 and of shaft 52 with its drive rib 56 in runner 624 of bolt 62. These figures are those of a stop device 6 made in a blade 615 attached to sleeve 4. In order not to congest the figures, references are not systematically repeated in all FIGS. 10A-11E.

It should be noted that the aim of the invention is to define the longitudinal adjustment range (direction XX) in the compression direction (B−) to retain an efficient compression range in the event of a violent impact of the driver against the steering wheel.

In all FIGS. 10A-11E the represented position of tightening shaft 52 is the same, and the only change for shaft 52 is its swivelling motion controlled by lever 51 between the tightened position (ordinary position) and the untightened position (exceptional position) for angular and longitudinal adjustment. Tightening shaft 52 is translationally secured (direction XX) to body 1 and forms the longitudinal adjustment marker of sleeve 4.

The swivelling of lever 51 and of its shaft 52 is limited as stated above, by the range of motion of catch 552 in runner 542; this gives rise to the two extreme swivelling positions 56A, 56C of drive rib 56.

In both swivel end of travel positions (56A, 56C) rib 56 forms a swivel limit stop for bolt 62, of which the crescent-shaped runner 624 receives rib 56.

For the description of the longitudinal adjustment and locking of it, it is necessary to distinguish two types of adjustment, depending on whether this adjustment is made in a certain position of extension of sleeve 4 relative to the position of bolt 62, or whether the adjustment is made at the authorised compression limit of sleeve 4 relative to body 1.

According to FIGS. 10A, 10B, for the normal adjustment which is not made at the compression limit of sleeve 4 in body 1, one merely needs to unlock, using lever 51, the motion of sleeve 4 for the latter to be able to slide relative to body 1 and to bolt 62.

After this longitudinal adjustment (direction XX) has been made, combined if applicable with the angular adjustment, these adjustments are locked using lever 51 and shaft 52. During this adjustment operation sleeve 4 has slid under bolt 62 (in direction B− or B+), without reaching the limit position or the engagement of bolt 62 against stop edge 612.

The adjustment is locked simply by the swivelling lever 51, which pulls shaft 52 and its rib 56 into runner 624, causing bolt 62 to swivel, surface 620 of which is separated from surface 610 of blade 615. Bolt 62 remains in this position with its tip 621 raised such that, in the event of an impact, sleeve 4 can pass under bolt 62 without any risk that the latter stops against stop 612 and that this translation motion (B−) is prevented, to cushion the violent impact against the steering wheel.

According to FIGS. 11A, 11B, 11D and 11E, for the adjustment arriving at the compression limit, the situation is treated differently by operating lever 51 and shaft 52 relative to bolt 62.

The tightening of sleeve 4 is initially unlocked using lever 51 and its shaft 52. Sleeve 4 slides and surface 620 of the bolt slides on top 610 of sleeve 4 (FIG. 11A). When sleeve 4 arrives, by its zone including stop edge 612, in the area of bolt 62, the latter, pushed by spring 63, swivels and engages its stop surface 625 against ridge 612 (FIG. 11B). Sleeve 4 can no longer be slid for adjustment relative to body 1 beyond this limit position.

If the driver wishes to adjust column 100 in this longitudinal position, they operate lever 51 to lock this adjustment (FIG. 11D). But for the safety reasons mentioned above it is necessary that in the event of a violent impact on the steering wheel sleeve 4 is able to be compressed beyond this limit position, and for this purpose bolt 62 must be released from stop edge 612.

The change from the adjustment position to the adjustment locking position occurs according to the invention by passing through the intermediate pre-tightening position (56B), in which the adjustment or adjustments are locked while bolt 62 is still engaged against stop edge 612 (FIG. 11D).

It is only after this locking, which is sufficient to prevent the driver, by an action, possibly compressing sleeve 4 beyond compression limit 612, that bolt 62 is released from stop ridge 612 for the remainder of the swivelling motion of drive rib 56 to locking position 56A; rib 56 then drives bolt 62 and releases it from edge 612 whilst holding it in this released position in order not to lock the cushioning compression of sleeve 4 in the event of a violent impact against the steering wheel (FIG. 11E).

To obtain this intermediate pre-tightening position 56B, crescent-shaped runner 624 goes beyond position 56B in order that bolt 62 is not released from its locking position before sleeve 4 is tightened relative to body 1 sufficiently to maintain this adjustment, and before drive rib 56 swivels bolt 62; it is only then that rib 56 comes into contact with edge 624A of runner 624 to drive bolt 62 and release it from stop edge 612. Bolt 62 is held in this raised position, such that sleeve 4 will be able to slide and cushion a sudden impact exerted on the steering wheel and thus on sleeve 4.

According to a particular case of limit position adjustment described above using FIGS. 11A, 11B, 11D and 11E, it can happen that in the adjusted compression limit position according to FIG. 11B, a motion or an impact on bolt 62 raises it slightly, although it is pressed by spring 63; the bolt may then release its stop surface 625 from edge 612 but will remain attached by its auxiliary surface 626.

FIG. 11C shows this special case of locking of sleeve 4 at the end of travel in the compression direction.

Indeed, in the untightened position and the adjustment of the compression end of travel position of FIG. 11C, it can occur that due to a sudden adjustment motion or due to blows transmitted to sleeve 4 by the driver who makes the adjustment operations, stop surface 625 may escape to a small extent from stop edge 612, such that auxiliary stop surface 626 becomes attached to stop edge 612 and achieves the compression end of travel position for longitudinal adjustment.

From this position 11C, the tightening motion is continued by swivelling shaft 52, to achieve a position close to position 56B (FIG. 11B) corresponding to pre-tightening. This position has not been represented. Tightening is then terminated (FIG. 11E) with the release of bolt 62, which allows forced sliding of sleeve 4 in the event of an impact.

FIGS. 12A and 12B show at an enlarged scale the support of bolt 62 by its stop surface 625 against stop edge 612 and the support of bolt 62 by its auxiliary surface 626 against stop edge 612 in the case of adjustment at the limit position.

It should moreover be emphasised that positions 12A, 12B can be occasional longitudinal adjustment end of travel positions, which can also be left simply by sliding sleeve 4 in extension direction B+, and reach the adjustment position such as the habitual position represented in FIGS. 10A, 10B.

In conclusion, after the longitudinal adjustment (and the angular adjustment, if applicable), tightening mechanism 5 locks the adjustments (longitudinal adjustment and angular adjustment concerned by this stop device). Stop device 6 is neutralised since its swivelling is held by shaft 52 and rib 56.

In the event of an impact against the steering wheel sleeve 4 can slide without being prevented by stop device 6 since underside 620 of bolt 62 has no contact with top 610 of blade 615 or, as a variant (without blade 615), on the top of sleeve 4.

LIST OF MAIN ELEMENTS

100 Steering column
1 Body
   11 Deformable bearing
   12 Support surface
      121 Piercing
   13 Passage left free by the bearing 2 Assistance module
  21 Engine and accessories
  22 Swivel tabs
3 Bracket
  31 Crosspiece
  32 Tab
  33 Return spring
  34 Cheek
    341 Runner
  35 Cheek
    351 Runner
4 Sleeve
  41 Controls bracket
  42 Tube supporting the steering wheel
    421 Fluted end
  43 Rolling bearing
  45 Slot
5 Tightening mechanism
  51 Lever
  52 Tightening shaft
    521 Threaded end
    522 Nut
  53 Tightening device
  54 Plate
    541 Cup
    542 Runner
  55 Base
    551 Slide
    552 Catch
  56 Drive rib
6 Compression adjustment limit stop device
  61 Compression limit stop
    610 Top of the blade 615 or of sleeve 4
    611 Tongue
    612 Stop edge/edge forming the stop
    613 Slot of the blade
    615 Blade
    616 Rivet
  62 Bolt
    620 Underside of the bolt
    621 Tip
    622 Lug
    623 Circular aperture
    624 Crescent-shaped runner
    624A, 624C Sides of the runner
    625 Stop surface
    626 Auxiliary stop surface
    627 Support surface
    628 Support surface
  63 Leaf spring
    631 Clip
    632 Circular aperture
    633 Slot
    634 End
  64 Intermediate spacer
A Tilting range/angular adjustment
B Extension range/longitudinal adjustment
B− Compression direction
B+ Extension direction
C Tilting range of the bolt
XX Geometrical axis of extension of the column
YY Transverse geometrical axis of the tightening axis

The invention claimed is:

1. A steering column comprising:
  a body receiving, in a deformable bearing, a sleeve supporting the steering wheel, which is adjustable longitudinally relative to the body,
  a tightening mechanism with a shaft with an operating lever supporting a tightening device compressing the deformable bearing locking the sleeve in a tightened position or allowing it to slide in an untightened position,
  wherein the shaft of the tightening mechanism can be swiveled between these two positions with the operating lever,
  the steering column characterized by the fact that it comprises
  a stop device with an abutment edge supported by the sleeve and forming an adjustment limit stop in the compression direction,
  where the tightening shaft has a mobile drive rib, through the swiveling of the tightening shaft between:
    the tightened position to lock the adjustments of the column,
    a pre-tightened position for the anticipated locking of the adjustments of the steering column, and
    the untightened position to enable longitudinal adjustment and angular adjustment of the steering column,
  a bolt installed on the tightening shaft, having:
    a circular runner forming a crescent-shaped clearance, delimited by two relative end of travel sides of the drive rib,
    a tip pushed by the spring such that it presses against the surface of the sleeve, and
    a stop surface supported by the tip and abutting with the stop edge when the sleeve passes under the bolt during adjustment,
  wherein the bolt is put into its locked position by the drive rib swiveling from the angular untightened position to the tightened position only after it passes through a pre-tightened position corresponding to the tightening of the adjustments by the tightening shaft without swiveling the bolt, and without releasing it from its locking position, before the drive rib abuts with the side of the runner, and then swivels the bolt and releases it from its position in which the sleeve is locked in the compression direction.

2. The steering column according to claim 1, wherein the stop device comprises a slot in the sleeve or the blade forming the stop edge.

3. The steering column according to claim 2, wherein the slot forms a tongue preventing the bolt from moving in any way other than by its support surface abutting with the stop edge.

4. The steering column according to claim 2, wherein the stop device is made in a blade attached to the sleeve in the zone of the sleeve which passes under the bolt.

5. The steering column according to claim 1, wherein the bolt is a part installed around the shaft having
  a tip supporting the stop surface,
  at least one lug with an aperture to receive the shaft and a circular runner lining the aperture and receiving the drive rib which is securely coupled to the shaft to achieve a free relative range of movement between the shaft and the bolt,
  a spring securely coupled to the shaft pressing on the tip to push the stop surface towards the stop edge.

6. The steering column according to claim 5, wherein the bolt comprises
  two lugs, each of which straddles the shaft and its rib, and
  a spacer locked on the shaft and on its rib to retain the bolt by both its lugs on the shaft and its rib in the direction of the shaft.

7. The steering column according to claim 6, wherein the spring is a leaf spring terminated by two clips each having an aperture to be clipped on to the shaft by the aperture, where this aperture has a slot receiving the rib of the shaft so as to be coupled securely to the shaft for rotary motion.

\* \* \* \* \*